United States Patent
Keehner

[11] Patent Number: 6,086,169
[45] Date of Patent: Jul. 11, 2000

[54] MIDWHEEL ASSEMBLY FOR A TRACK TYPE TRACTOR

[75] Inventor: Daniel M. Keehner, Peoria, Ill.

[73] Assignee: Caterpillar Inc., Peoria, Ill.

[21] Appl. No.: 09/196,044

[22] Filed: Nov. 19, 1998

[51] Int. Cl.[7] .............................................. B62D 55/14
[52] U.S. Cl. .......................................... 305/137; 305/142
[58] Field of Search .................... 305/137, 142, 305/138, 136, 141; 180/9.5, 9.46; 301/64.4

[56] References Cited

U.S. PATENT DOCUMENTS

| | | | |
|---|---|---|---|
| Re. 34,909 | 4/1995 | Kindel et al. ............................... | 305/24 |
| 2,791,256 | 5/1957 | Sinclair ...................................... | 152/47 |
| 2,838,344 | 6/1958 | Eyb ............................................ | 305/9 |
| 3,013,843 | 12/1961 | Sinko ...................................... | 180/9.46 |
| 3,540,743 | 11/1970 | Ashton ...................................... | 277/92 |
| 3,567,292 | 3/1971 | Amsden .................................... | 305/57 |
| 4,425,008 | 1/1984 | Weeks ...................................... | 305/24 |
| 4,538,860 | 9/1985 | Edwards et al. ......................... | 305/56 |
| 4,838,373 | 6/1989 | Price et al. ............................. | 180/9.46 |
| 4,881,609 | 11/1989 | Purcell et al. ........................... | 180/9.5 |
| 4,923,257 | 5/1990 | Purcell .................................... | 305/137 |
| 4,950,030 | 8/1990 | Kindel et al. ............................. | 305/24 |
| 4,998,783 | 3/1991 | Erlenmaier et al. ...................... | 305/56 |
| 5,022,718 | 6/1991 | Diekevers ................................ | 305/24 |
| 5,533,587 | 7/1996 | Dow et al. ............................... | 305/142 |
| 6,012,784 | 1/2000 | Oertley .................................... | 305/137 |

FOREIGN PATENT DOCUMENTS

| | | | |
|---|---|---|---|
| 2733307 | 2/1979 | Germany ................................ | 305/137 |
| 461015 | 2/1979 | Russian Federation ............... | 305/137 |

Primary Examiner—S. Joseph Morano
Assistant Examiner—Long Bao Nguyen
Attorney, Agent, or Firm—Maginot, Addison & Moore

[57] ABSTRACT

A midwheel assembly for a track type tractor is disclosed. The midwheel assembly includes a hub having (i) a body portion and (ii) a hub plate extending radially from the body portion. The midwheel assembly also includes a wheel having (i) a wheel plate secured to the body portion of the hub and (ii) a ring member secured to the wheel plate such that the ring member extends from the wheel plate toward the hub plate so that the ring member, the wheel plate, and the hub plate define a wheel cavity. The midwheel assembly further includes a track assembly having (i) a carcass having an upper surface and a lower surface, (ii) a tread bar extending from the lower surface of the carcass, and (iii) a guide block extending from the upper surface of the carcass, wherein (i) the ring member is positioned directly above the upper surface of the carcass, (ii) the hub plate is positioned adjacent to the guide block, (iii) the hub plate has a guide block face defined thereon, (iv) the guide block face is positioned adjacent to the guide block, and (v) the guide block periodically contacts the guide block face during use of the midwheel assembly.

20 Claims, 3 Drawing Sheets

MIDWHEEL ASSEMBLY FOR A TRACK TYPE TRACTOR

TECHNICAL FIELD OF THE INVENTION

The present invention relates generally to track type tractors, and more particularly to a midwheel assembly for a track type tractor.

BACKGROUND OF THE INVENTION

Work machines, such as track type tractors, typically include a pair of midwheel assemblies. Each midwheel assembly generally includes a rubber track which forms a loop around a front roller, a number of midwheels, and a rear roller. During use of the track type tractor, the rear roller rotates and drives the rubber track around a path defined by the rear roller and the front roller. The rotation of the rubber track causes it to engage the ground, thereby propelling the track type tractor over the ground to perform various work functions.

The midwheels of the midwheel assembly are subjected to significant mechanical loads during the use of the track assembly. For example, a number of guide blocks extending from the rubber track are urged against the midwheels when the track type tractor is driven in a curved path or on an inclined surface.

Heretofore, various midwheel designs have been utilized in order to accommodate the aforementioned mechanical loads. For example, some midwheels are cast as a single unitary piece. However, these types of midwheels require a significant amount of surface machining prior to use which increases their manufacturing cost. In addition, it is difficult to gain access to the interior of these types of midwheels, as a result, they are relatively difficult to maintain.

Other midwheel designs utilize two or more formed parts welded together to form a midwheel. This approach suffers from the drawback that the welding tends to increase the manufacturing costs of the midwheel.

What is needed therefore is a midwheel assembly which overcomes one or more of the above-mentioned drawbacks.

DISCLOSURE OF THE INVENTION

In accordance with a first embodiment of the present invention, there is provided a midwheel assembly for a track type tractor. The midwheel assembly includes a hub having (i) a body portion having an axle cavity defined therein and (ii) a hub plate extending radially from the body portion. The midwheel assembly also includes a wheel secured to the hub. The wheel has (i) a wheel plate and (ii) a ring member secured to the wheel plate such that the ring member extends from the wheel plate toward the hub plate so that the ring member, the wheel plate, and the hub plate define a wheel cavity. The midwheel assembly further includes an axle positioned within the axle cavity such that the wheel and the hub can rotate relative to the axle, wherein (i) the hub plate has a first peripheral end segment, (ii) the ring member has a second peripheral end segment, and (iii) the first peripheral end segment is spaced apart from the second peripheral end segment so as to define an insulation space therebetween.

In accordance with a second embodiment of the present invention, there is provided a midwheel assembly for a track type tractor. The midwheel assembly includes a hub having (i) a body portion and (ii) a hub plate extending radially from the body portion. The midwheel assembly also includes a wheel having (i) a wheel plate secured to the body portion of the hub and (ii) a ring member secured to the wheel plate such that the ring member extends from the wheel plate toward the hub plate so that the ring member, the wheel plate, and the hub plate define a wheel cavity. The midwheel assembly further includes a track assembly having (i) a carcass having an upper surface and a lower surface, (ii) a tread bar extending from the lower surface of the carcass, and (iii) a guide block extending from the upper surface of the carcass, wherein (i) the ring member is positioned directly above the upper surface of the carcass, (ii) the hub plate is positioned adjacent to the guide block, (iii) the hub plate has a guide block face defined thereon, (iv) the guide block face is positioned adjacent to the guide block, and (v) the guide block periodically contacts the guide block face during use of the midwheel assembly.

In accordance with a third embodiment of the present invention there is provided a midwheel assembly for a track type tractor. The midwheel assembly includes a hub having (i) a body portion having an axle cavity defined therein and (ii) a hub plate extending radially from the body portion. The midwheel assembly also includes a wheel having (i) a wheel plate secured to the body portion of the hub and (ii) a ring member secured to the wheel plate such that the ring member extends from the wheel plate toward the hub plate so that the ring member, the wheel plate, and the hub plate define a wheel cavity. The midwheel assembly also includes an axle positioned within the axle cavity such that the wheel and the hub can rotate relative to the axle. The midwheel assembly further includes a track assembly having (i) a carcass having an upper surface and a lower surface, (ii) a tread bar extending from the lower surface of the carcass, and (iii) a guide block extending from the upper surface of the carcass, wherein (i) the ring member is positioned directly above the upper surface of the carcass, (ii) the hub plate is positioned adjacent to the guide block, (iii) the hub plate has a guide block face defined thereon, (iv) the guide block face is positioned adjacent to the guide block, (v) the guide block periodically contacts the guide block face during use of the midwheel assembly, (vi) the hub plate has a first peripheral end segment, (vii) the ring member has a second peripheral end segment, and (viii) the first peripheral end segment is spaced apart from the second peripheral end segment so as to define an insulation space therebetween.

BEST MODE FOR CARRYING OUT THE INVENTION

Figure 1:
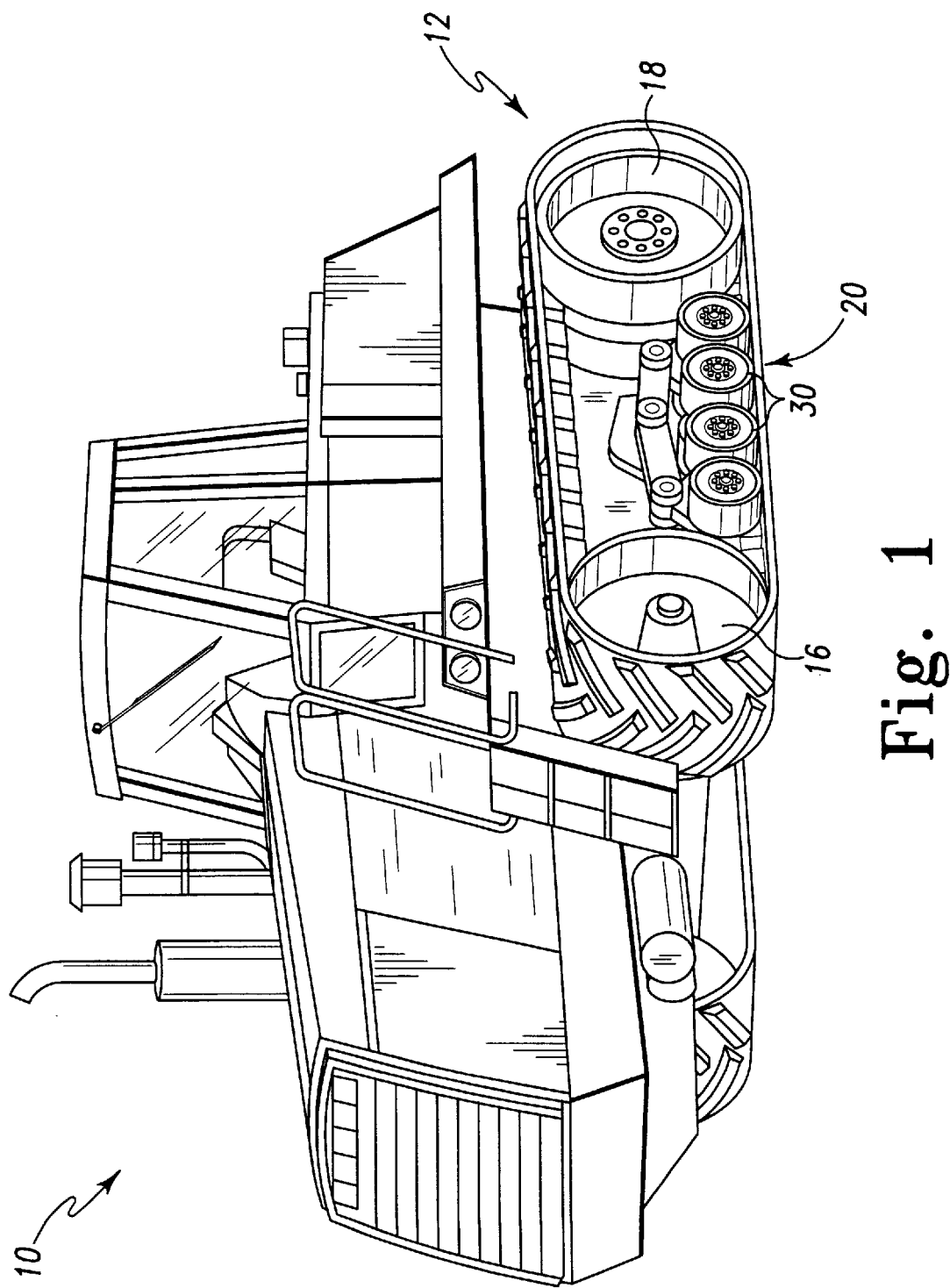
FIG. 1 is a perspective view of a track type tractor which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
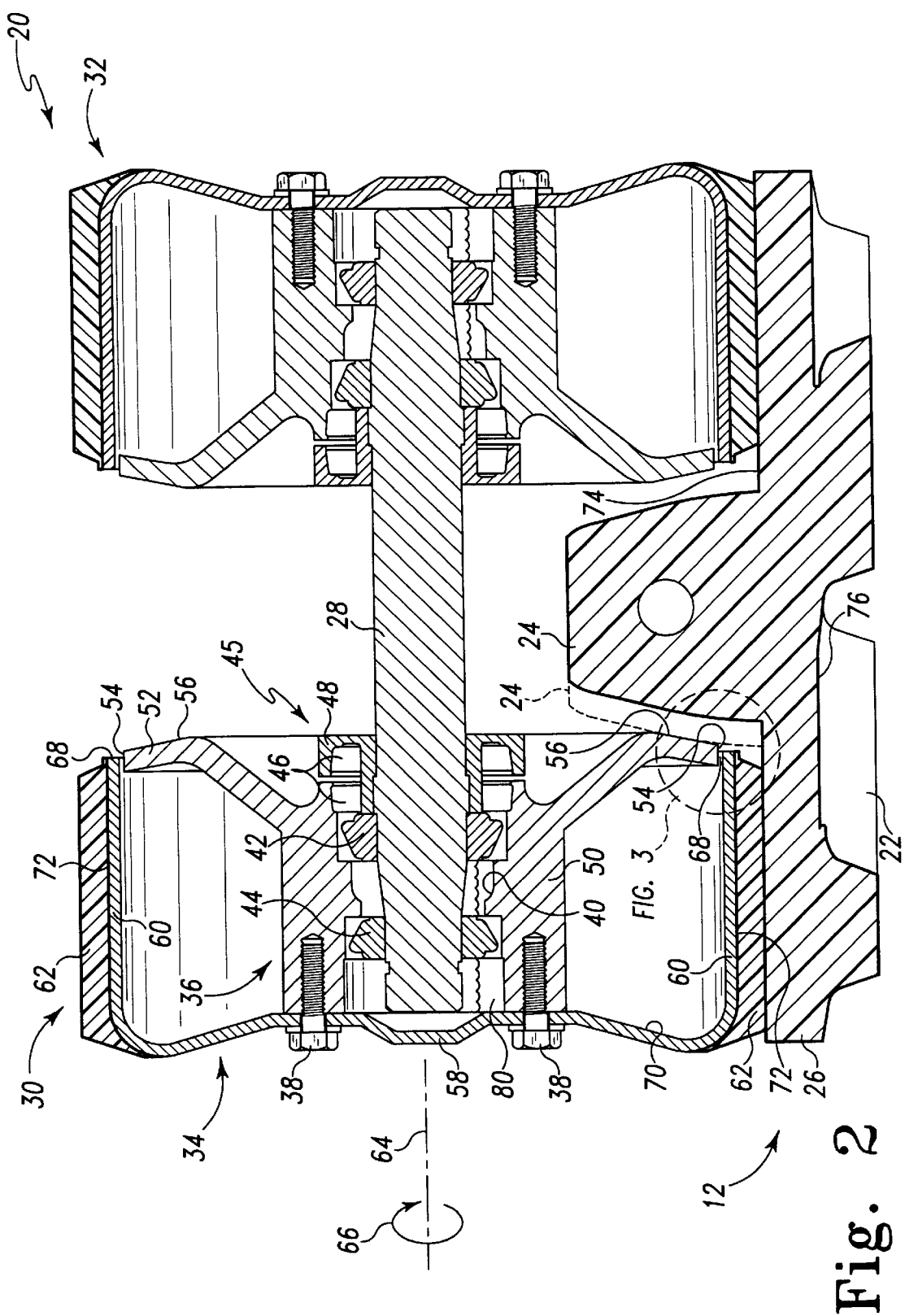
FIG. 2 is a cross sectional view of a midwheel assembly of the track type tractor of FIG. 1.

Referring now to FIGS. 1 and 2, there is shown a track type tractor 10 which incorporates the features of the present invention therein. Track type tractor 10 includes a forward roller 16, a rear roller 18, and a midwheel assembly 20.

Midwheel assembly 20 includes a number of outer wheel assemblies 30, a number of inner wheel assemblies 32, an axle 28, and a track assembly 12. Each outer wheel assembly 30 includes a hub 36 having (i) a body portion 50 having an axle cavity 40 defined therein and (ii) a hub plate 52 extending radially from body portion 50. Each outer wheel assembly 30 also includes a wheel 34 having (i) a wheel plate 58 secured to body portion 50 of hub 36 with a pair of bolts 38 and (ii) a ring member 60 secured to wheel plate 58 such that ring member 60 extends from wheel plate 58 toward hub plate 52 so that ring member 60, wheel plate 58, and hub plate 52 collectively define a wheel cavity 70. Each outer wheel assembly 30 further includes a rubber cover 62 secured to an outer surface 72 of ring member 60, a volume of oil 80 disposed in axle cavity 40, a collar assembly 45, and a pair of roller bearing assemblies 42 and 44. Note that rubber cover 62 can be secured to outer surface 72 of ring member 60 using an appropriate adhesive. Also note that rubber cover has a circular shape and surrounds ring member 60.

It should be understood that hub plate 52 has a disk like shape and a peripheral end segment 54 which encircles axle 28. Ring member 60 also has a peripheral end segment 68 which encircles axle 28. As shown more clearly in FIG. 3, peripheral end segment 54 is spaced apart from peripheral end segment 68 so as to define an insulation space 78 therebetween. However, it should be appreciated that peripheral end segment 54 is close enough to peripheral end segment 68 such that, under extreme loads, ring member 60 can flex and contact hub plate 52. Allowing ring member 60 to flex and contact hub plate 52 under extreme loads increases the structural strength of outer wheel assembly 30. Preferably, the distance between peripheral end segment 54 and peripheral end segment 68 is in the range of about 1.0 to 5.0 millimeters. More preferably, the distance between peripheral end segment 54 and peripheral end segment 68 is about 2.0 millimeters.

It should also be understood that axle 28 is positioned within axle cavity 40. Roller bearing assemblies 42 and 44 are disposed around axle 28 and positioned within axle cavity 40 such that wheel 34 and hub 36 can rotate relative to axle 28.

Track assembly 12 includes (i) a carcass 26 having an upper surface 74 and a lower surface 76, (ii) a tread bar 22 extending from lower surface 76 of carcass 26, and (iii) a guide block 24 extending from upper surface 74 of carcass 26. Track assembly 12 is disposed around front roller 16 and rear roller 18 as shown in FIG. 1. As shown in FIG. 2, track assembly 12 is positioned relative to inner wheel assembly 32 and outer wheel assembly 32 such that guide block 24 is interposed therebetween. Track assembly 12 is further positioned relative to wheel 34 and hub 36 of outer wheel assembly 32 such that (i) ring member 60 is positioned directly above upper surface 74 of carcass 26 and (ii) hub plate 52 is positioned adjacent to guide block 24.

Positioning track assembly 12 relative to outer wheel assembly 30 in the above described manner interposes rubber cover 62 between upper surface 74 of carcass 26 and outer surface 72 of ring member 60. In addition, positioning track assembly 12 relative to outer wheel assembly 30 in the above described manner locates an annular guide block face 56 defined on hub plate 52 adjacent to guide block 24. (Note that that guide block face encircles axle 28.)

Collar assembly 45 includes (i) a collar 48 disposed around axle 28 and (ii) a seal 46 disposed around collar 48 such that seal 46 is interposed between collar 48 and body portion 50 of hub 36. Collar assembly 45 is disposed around axle 28 and positioned within axle cavity 40 so as to prevent volume of oil 80 from exiting axle cavity 40.

It should be appreciated that each inner wheel assembly 32 is constructed in a substantially identical manner as described above for each outer wheel assembly 30. Axle 28 is also positioned within an axle cavity 40 of each inner wheel assembly 32 such that the wheel and hub of inner wheel assembly 32 can rotate relative to axle 28. Furthermore, as shown in FIG. 2, each inner wheel assembly 32 is positioned relative to track assembly 12 in a manner corresponding to that described above for each outer wheel assembly 30.

Industrial Applicability

During use of track type tractor 10 track assembly 12 rotates around a path defined by forward roller 16 and rear roller 18. As track assembly 12 rotates in the above described manner rubber cover 62 of each outer wheel assembly 30 contacts upper surface 74 of carcass 26 which causes outer wheel assembly 30 to rotates around a central axis 64 in a direction indicated by arrow 66 (see FIG. 2). Inner wheel assembly 32 is rotated in a substantially identical manner.

It should be appreciated that as track type tractor 10 is operated in the above described manner, guide block 24 periodically contacts guide block face 56 of hub plate 52. For example, as track type tractor 10 is driven in a curved path, track assembly 12 moves relative to outer wheel assembly 30 such that guide block 24 comes into contact with guide block face 56 (see FIG. 2). Positioning guide block 24 in contact with guide block face 56 ensures that track assembly 12 remains disposed around forward roller 16 and rear roller 18. Positioning guide block 24 in contact with guide block face 56 as outer wheel assembly 30 rotates around central axis 64 and track assembly 12 rotates around a path defined by forward roller 16 and rear roller 18 causes hub plate 52 to heat up as a result of the friction between guide block face 56 and guide block 24. The heat generated by the aforementioned friction is conducted to body portion 50 and the volume oil 80 contained within axle cavity 40 via hub plate 52.

Figure 3:
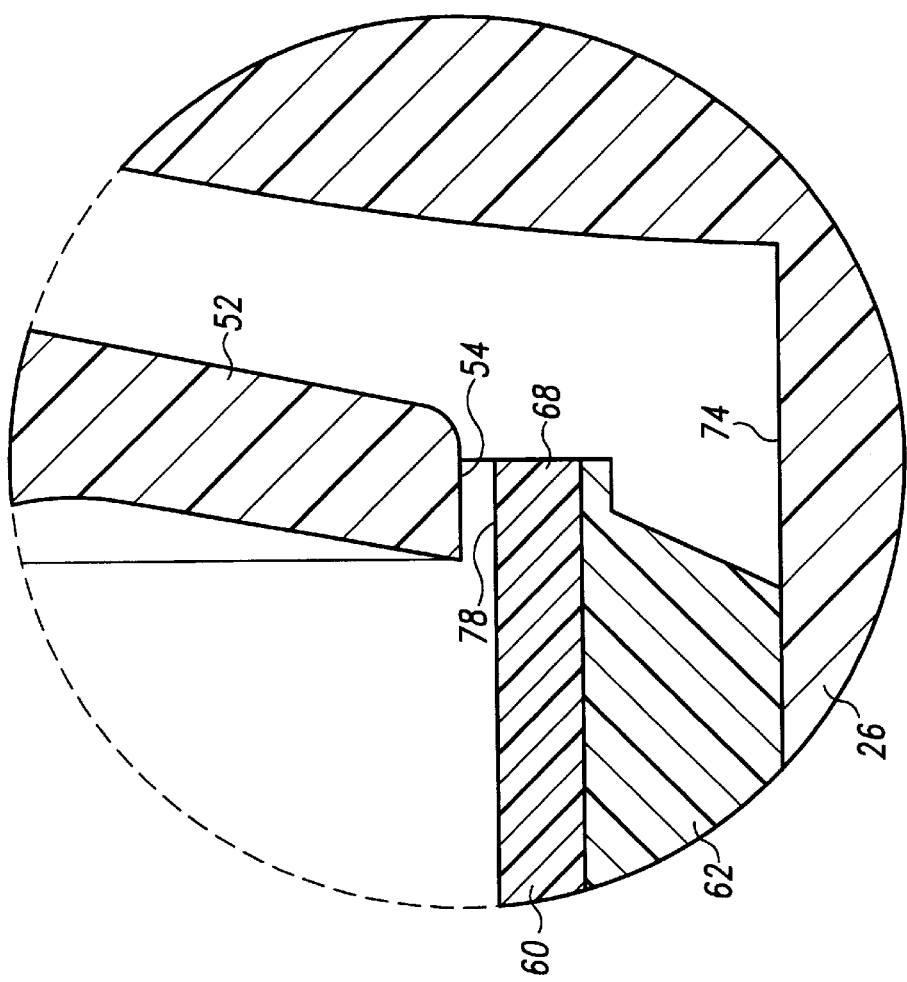
FIG. 3 is an enlarged view of the portion of FIG. 2 which is encircled and indicated as FIG. 3.

However, it should be understood that the aforementioned heat is prevented from being conducted from hub plate 52 to ring member 60 by insulation space 78 (see FIG. 3). Preventing the conduction of heat to ring member 60 substantially prevents rubber cover 62 from being heated as a result of the friction between guide block 24 and guide block face 56. This is an important aspect of the present invention since other midwheel assembly designs allow the frictional heat generated between the guide block and the guide block face to be conducted to the rubber cover which can cause maintenance problems. For example, excessively heating the rubber cover via the above described frictional heat can cause the rubber cover to detach from the ring member.

Another advantage of the present invention is that none of the components of either outer wheel assembly 30 or inner wheel assembly 32 are welded together which decreases their manufacturing cost. Furthermore, wheel 34 can be easily removed from hub 36 by removing bolts 38 so as to gain access to wheel cavity 70 for maintenance purposes. In addition, outer wheel assemblies 30 and inner wheel assemblies 32 of the present invention require less machining as compared to other midwheel assembly designs. Specifically, only guide block face 56 requires machining. Therefore, the manufacturing cost of midwheel assembly 20 is less as compared to other midwheel assembly designs.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, while the above disclosure describes track type tractors it should be understood that the midwheel assembly 20 of the present invention can be used on any rubber belted work vehicle.

What is claimed is:

1. A midwheel assembly for a track type tractor, comprising:
    a hub including (i) a body portion having an axle cavity defined therein and (ii) a hub plate extending outwardly from said body portion;
    a wheel including (i) a wheel plate secured to said hub and (ii) a ring member secured to said wheel plate such that said ring member extends from said wheel plate toward said hub plate so that said ring member, said wheel plate, and said hub plate collectively define a wheel cavity,
    wherein (i) said hub plate has a first peripheral end segment, (ii) said ring member has a second peripheral end segment, and (iii) said first peripheral end segment is spaced apart from said second peripheral end segment so as to define an insulation space therebetween.

2. The midwheel assembly of claim 1, further comprising:
    a track assembly which includes (i) a carcass having an upper surface and a lower surface, (ii) a tread bar extending from said lower surface of said carcass, and (iii) a guide block extending from said upper surface of said carcass,
    wherein said track assembly is positioned relative to said wheel and said hub such that (i) said ring member is positioned directly above said upper surface of said carcass and (ii) said hub plate is positioned adjacent to said guide block.

3. The midwheel assembly of claim 2, further comprising:
    a rubber cover secured to an outer surface of said ring member such that said rubber cover is interposed between said upper surface of said carcass and said outer surface of said wheel.

4. The midwheel assembly of claim 2, wherein:
    said hub plate has a guide block face defined thereon,
    said guide block face is positioned adjacent to said guide block, and
    said guide block contacts said guide block face during use of said midwheel assembly.

5. The midwheel assembly of claim 1, wherein:
    said wheel plate is secured to said body portion of said hub.

6. The midwheel assembly of claim 1, further comprising:
    a volume of oil disposed in said axle cavity;
    an axle positioned within said axle cavity such that said wheel and said hub can rotate relative to said axle; and
    a collar assembly disposed around said axle and positioned within said axle cavity so as to prevent is said volume of oil from exiting said axle cavity.

7. The midwheel assembly of claim 6, wherein:
    said collar assembly includes (i) a collar disposed around said axle and (ii) a seal disposed around said collar such that said seal is interposed between said collar and said body portion of said hub.

8. The midwheel assembly of claim 6, further comprising:
    a roller bearing assembly disposed around said axle and positioned within said axle cavity.

9. A midwheel assembly for a track type tractor, comprising:
    a hub including (i) a body portion and (ii) a hub plate extending radially from said body portion;
    a wheel including (i) a wheel plate secured to said body portion of said hub and (ii) a ring member secured to said wheel plate such that said ring member extends from said wheel plate toward said hub plate so that said ring member, said wheel plate, and said hub plate collectively define a wheel cavity; and
    a track assembly which includes (i) a carcass having an upper surface and a lower surface, (ii) a tread bar extending from said lower surface of said carcass, and (iii) a guide block extending from said upper surface of said carcass,
    wherein (i) said ring member is positioned above said upper surface of said carcass, (ii) said hub plate is positioned adjacent to said guide block, (iii) said hub plate has a guide block face defined thereon, (iv) said guide block face is positioned adjacent to said guide block, and (v) said guide block contacts said guide block face during use of said midwheel assembly.

10. The midwheel assembly of claim 9, wherein:
    (i) said hub plate has a first peripheral end segment, (ii) said ring member has a second peripheral end segment, and (iii) said first peripheral end segment is spaced apart from said second peripheral end segment so as to define an insulation space therebetween.

11. The midwheel assembly of claim 9, further comprising:
    an axle positioned within an axle cavity defined in said body portion of said hub such that said wheel and said hub can rotate relative to said axle.

12. The midwheel assembly of claim 9, further comprising:
    a rubber cover secured to an outer surface of said ring member such that said rubber cover is interposed between said upper surface of said carcass and said outer surface of said wheel.

13. The midwheel assembly of claim 11, further comprising:
    a volume of oil disposed in said axle cavity; and
    a collar assembly disposed around said axle and positioned within said axle cavity so as to prevent said volume of oil from exiting said axle cavity.

14. The midwheel assembly of claim 13, wherein:
    said collar assembly includes (i) a collar disposed around said axle and (ii) a seal disposed around said collar such that said seal is interposed between said collar and said body portion of said hub.

15. The midwheel assembly of claim 11, further comprising:
    a roller bearing assembly disposed around said axle and positioned within said axle cavity.

16. A midwheel assembly for a track type tractor, comprising:
    a hub including (i) a body portion having an axle cavity defined therein and (ii) a hub plate extending radially from said body portion;
    a wheel including (i) a wheel plate secured to said body portion of said hub and (ii) a ring member secured to said wheel plate such that said ring member extends from said wheel plate toward said hub plate so that said ring member, said wheel plate, and said hub plate define a wheel cavity;

an axle positioned within said axle cavity such that said wheel and said hub can rotate relative to said axle; and a track assembly which includes (i) a carcass having an upper surface and a lower surface, (ii) a tread bar extending from said lower surface of said carcass, and (iii) a guide block extending from said upper surface of said carcass, wherein (i) said ring member is positioned directly above said upper surface of said carcass, (ii) said hub plate is positioned adjacent to said guide block, (iii) said hub plate has a guide block face defined thereon, (iv) said guide block face is positioned adjacent to said guide block, (v) said guide block periodically contacts said guide block face during use of said midwheel assembly, (vi) said hub plate has a first peripheral end segment, (vii) said ring member has a second peripheral end segment, and (viii) said first peripheral end segment is spaced apart from said second peripheral end segment so as to define an insulation space therebetween.

17. The midwheel assembly of claim 16, further comprising:

a rubber cover secured to an outer surface of said ring member such that said rubber cover is interposed between said upper surface of said carcass and said outer surface of said wheel.

18. The midwheel assembly of claim 16, further comprising:

a volume of oil disposed in said axle cavity; and a collar assembly disposed around said axle and positioned within said axle cavity so as to prevent said volume of oil from exiting said axle cavity.

19. The midwheel assembly of claim 18, wherein:

said collar assembly includes (i) a collar disposed around said axle and (ii) a seal disposed around said collar such that said seal is interposed between said collar and said body portion of said hub.

20. The midwheel assembly of claim 16, further comprising:

a roller bearing assembly disposed around said axle and positioned within said axle cavity.

\* \* \* \* \*